United States Patent [19]
Hammack et al.

[11] Patent Number: 6,088,053
[45] Date of Patent: Jul. 11, 2000

[54] DIGITAL RECORD AND REPLAY BINOCULARS

[76] Inventors: Jack C. Hammack, 16137 SE. 33rd Cir., Bellevue, Wash. 98008; Steven R. Hammack, 1280 Ocean Shores Blvd. SW., Ocean Shores, Wash. 98569

[21] Appl. No.: 08/924,546

[22] Filed: Aug. 27, 1997

Related U.S. Application Data

[63] Continuation of application No. 08/680,367, Jul. 15, 1996.

[51] Int. Cl.⁷ ....................................... H04N 7/18
[52] U.S. Cl. ............................... 348/61; 348/333; 386/117
[58] Field of Search ............................... 348/61, 64, 143, 348/207, 333, 334; 358/906; 386/117, 120, 38; H04N 7/18

[56] References Cited

U.S. PATENT DOCUMENTS

| | | |
|---|---|---|
| D. 259,569 | 6/1981 | Nishioka . |
| D. 262,632 | 1/1982 | Yamazaki . |
| D. 265,479 | 7/1982 | Yamazaki . |
| 3,981,021 | 9/1976 | Beecher . |
| 4,067,027 | 1/1978 | Yamazaki . |
| 4,571,628 | 2/1986 | Thornton . |
| 4,628,210 | 12/1986 | Hobrough . |
| 4,875,107 | 10/1989 | Heidt et al. ............................... 386/117 |
| 4,887,161 | 12/1989 | Watanabe et al. ....................... 358/906 |
| 4,930,861 | 6/1990 | Okabe et al. . |
| 5,003,385 | 3/1991 | Sudo . |
| 5,006,872 | 4/1991 | Parker . |
| 5,028,994 | 7/1991 | Miyakawa et al. . |
| 5,040,068 | 8/1991 | Parulski et al. ........................... 386/38 |
| 5,067,804 | 11/1991 | Kitajima et al. . |
| 5,077,612 | 12/1991 | Megrgardt et al. ........................ 386/33 |
| 5,142,357 | 8/1992 | Lipton et al. . |
| 5,291,282 | 3/1994 | Nakagawa et al. ...................... 348/384 |
| 5,307,202 | 4/1994 | Martino et al. . |
| 5,448,294 | 9/1995 | Yamazaki ................................ 348/230 |
| 5,488,433 | 1/1996 | Washino et al. ......................... 348/722 |
| 5,541,656 | 7/1996 | Kare et al. ............................... 348/334 |
| 5,576,757 | 11/1996 | Roberts et al. .......................... 348/207 |

*Primary Examiner*—Young Lee
*Attorney, Agent, or Firm*—Christensen O'Connor Johnson & Kindness PLLC

[57] ABSTRACT

A combined binocular viewing and digital recording device includes a binocular telescope wherein the binocular telescope includes a pair of monocular components (12a,b). Each monocular component (12a,b) has an image viewing end and an image receiving end. The monocular components (12a,b) include a focusing mechanism (18) to adjust images viewed through the image viewing end of the monocular components. Also, the device includes a digital video camera (15) mounted to and displaced between each monocular component. The camera includes a receiving lens (21) for receiving images with the camera lens' line-of-sight approximately parallel to the line-of-sight of the monocular components. The camera further includes random access memory (RAM) (56) and a display device (16). Processors (46, 48, 50, 52, 54) are also included within the camera for generating compressed digital video images of the received images, storing the compressed digital video images in the RAM, and displaying the received or stored images on the display device. The camera includes control mechanisms (26, 28, 30, 32) for controlling the generating, storing, and displaying of the video images.

22 Claims, 10 Drawing Sheets

DIGITAL RECORD AND REPLAY BINOCULARS

CROSS-REFERENCE TO RELATED CLAIMS

This application is a filed Wrapper Continuation of prior U.S. patent application Ser. No. 08/680,367, filed on Jul. 15, 1996.

FIELD OF THE INVENTION

This invention relates to binoculars, and more particularly relates to a digital video camera incorporated into a one-piece, hand-held binocular unit.

BACKGROUND OF THE INVENTION

For the general public, recording images as they happen has become a national pastime. Camera and video recording technology has been incorporated into many commonly known products, such as microscopes, telescopes and binoculars.

Recording of video images from a common set of binoculars allows the user to identify and record events at great distances. U.S. Pat. No. 4,067,027 to Yamazaki discloses a binocular telescope containing a camera for photographing object scenes through the binocular lenses. Yamazakis invention is useful for users that wish to capture still images, but fails to allow the user to capture full video images.

U.S. Pat. No. 4,571,628 to Thornton discloses a binocular video viewing assembly having an integral object lens. The object lens observes the predetermined field of viewing and a processing assembly converts the resulting video image into electrical video signals. The electrical video signals are transferred to and stored in a remotely located video recorder. A liquid crystal display device is located within the video viewing assembly to display playback of video recorded on the remotely located video recorder. Thornton's device includes two eyepieces, like binoculars, and a single viewing lens. Although Thornton's device has the appearance and feel of binoculars, the single viewing lens generates only a single two-dimensional image, whereas binoculars allow the user to view a three-dimensional image. Also, Thornton's device fails to be fully portable because the video recorder is remotely located and must accompany the device in order to record images.

There is a need for a completely portable combined video camera and binocular system that permits storage of a visual image. Preferably, such a device will permit three dimensional viewing of objects simultaneous to recording of those objects.

SUMMARY OF THE INVENTION

In accordance with this invention, a one-piece, hand-held binocular and digital recording device is provided. The device permits simultaneous three dimensional viewing of an object through the binoculars and recording of the visual image of the object. The recording device converts the video image to digital video signals and records the digital video signals in a memory storage device within the hand-held unit. The recorded video signal may be viewed on a display that is also located on the hand-held unit.

More particularly described, the present invention provides a combined binocular viewing and digital recording device. The device includes binoculars having a pair of monocular components, each monocular component having an image viewing end and an image receiving end. The monocular components include a focusing mechanism to adjust images viewed through the image viewing end of the monocular components. Also, the device includes a digital video camera mounted to the binoculars. The camera includes a receiving lens for receiving images within the camera lens' line-of-sight and aligned approximately parallel to the line-of-sight of the monocular components. The camera further includes random access memory (RAM) and a display device. A processor is also included within the camera for generating compressed digital video images of the received images, storing the compressed digital video images in the RAM, and displaying the received or stored images on the display device. Finally, the camera includes control mechanisms for controlling the generating, storing, and displaying of the video images.

In accordance with other aspects of this invention, the control means includes forward and reverse viewing controls. The viewing controls preferably are multiple speed viewing controls.

In accordance with further aspects of this invention, the control means includes tint, brightness, and color controls.

In accordance with still other aspects of this invention, the camera includes a removable storage medium for storing the compressed video images.

In accordance with still further aspects of this invention, the camera further includes a data transmission mechanism for transmitting video images from the camera to a remote source.

In accordance with yet other aspects of this invention, the display is a liquid crystal display.

In accordance with still yet other aspects of this invention, the display is rotatable so that it may be viewed from different directions.

In accordance with other aspects of this invention, comprises a solar power converter for converting solar rays into electrical energy for powering the digital video camera, wherein the solar power converter is remotely located from the digital video camera and electrically connected to the digital video camera As will be readily appreciated from the foregoing summary, the invention provides for compactly storing and reviewing of recorded video images while viewing those images through a binocular telescope.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
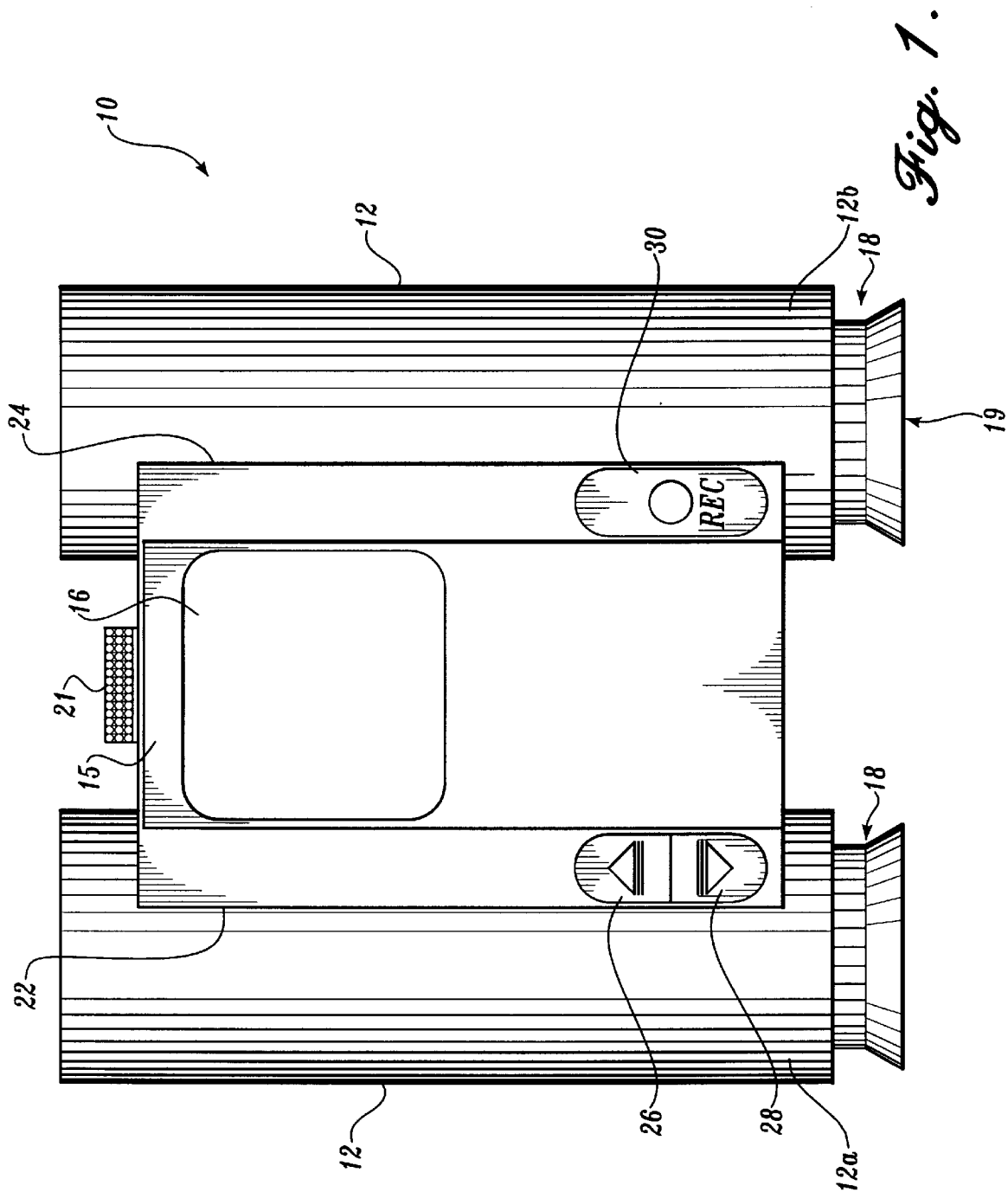
FIG. 1 is a top view of the one piece, hand-held, combined binoculars and video recording unit incorporating the present invention.

Referring now to the drawings, in which like reference numerals represent like parts throughout the several views, FIG. 1 sets forth a one piece, hand-held unit 10 incorporating the present invention. Briefly described, the hand-held unit 10 includes conventional binoculars 12 combined with a miniature digital video camera 15. A display, preferably a liquid crystal display (LCD) 16, is mounted on top of the binoculars 12. The hand-held unit 10 is designed to permit simultaneous three dimensional viewing of an object through the binoculars 12 and recording of the visual image of the object by the digital video camera 15. The recorded image may then be viewed on the LCD 16.

The binoculars 12 include two monocular components 12a and 12b positioned parallel to each other. Each monocular component 12a, 12b, includes focus adjusting eyepieces 18 at a rear end, and magnifying lenses (not shown, but well known in the art) at a forward end. The focus-adjusting eyepieces 18 and the magnifying lenses are arranged so as to permit observation of distant objects. The monocular components 12a and 12b thus provide a magnified stereoscopic or 3 D image to a user of the hand-held device 10. Thus, the binoculars 12 perform a telescopic function. It can be appreciated to one of skill in the art that various focus adjusting mechanisms may be incorporated with the monocular components 12a, 12b.

Figure 3:
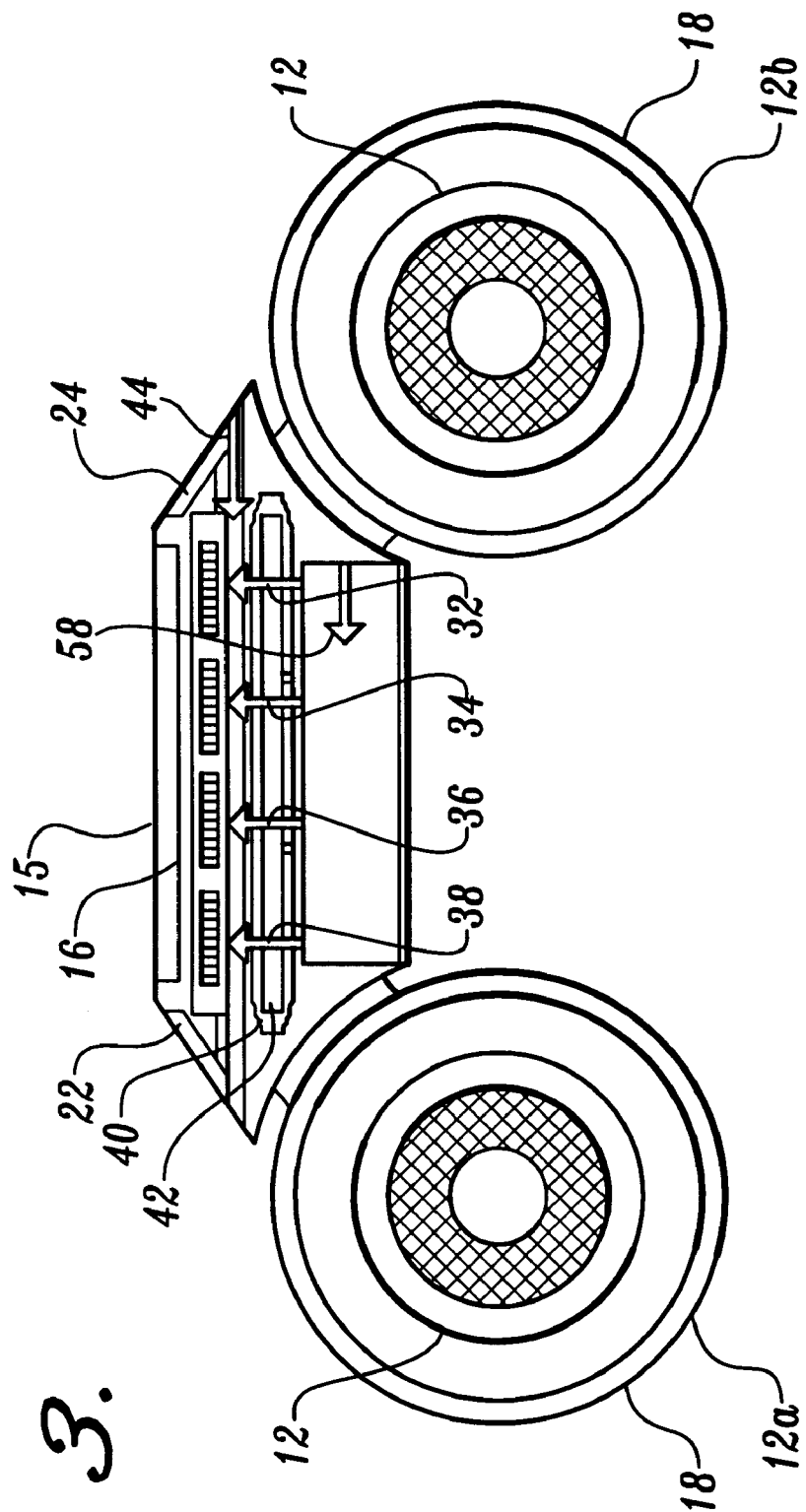
FIG. 3 is a sectional rear view of the unit of FIG. 1, with parts removed for detail.

The digital video camera 15 is attached between the top inner portion of the monocular components 12a and 12b and provides lateral support and separation of the monocular components. The digital video camera 15 includes a video camera lens 21 at the forward end of the digital video camera 15. The digital video camera 15 may be automatically focusing, such as is known in the art, or may have its focusing mechanism mechanically tied to the focus of the binoculars 12, thus allowing a user to zoom in on a specific action of interest. Top longitudinal edges 22, 24 (FIG. 3) of the digital video camera 15 slope downwardly away from the top of the digital video camera 15 to the upper portion of the monocular components 12a, 12b. Located at the rear end of the left downwardly sloping edge 22, collocated with the left monocular element 12a, are a forward/play button 26 and a reverse/play button 28. On the rear end of the right downwardly sloping edge, collocated with the right monocular element 12b, is a record button 30.

The LCD 16 is positioned on the forward half of the top surface of the digital video camera 15. The LCD 16 is preferably mounted flush with the top surface of the digital video camera 15. However, the LCD may also be a flip up variety 17 (FIG. 6), or may be located in any convenient location on the hand-held unit 10.

Figure 2:
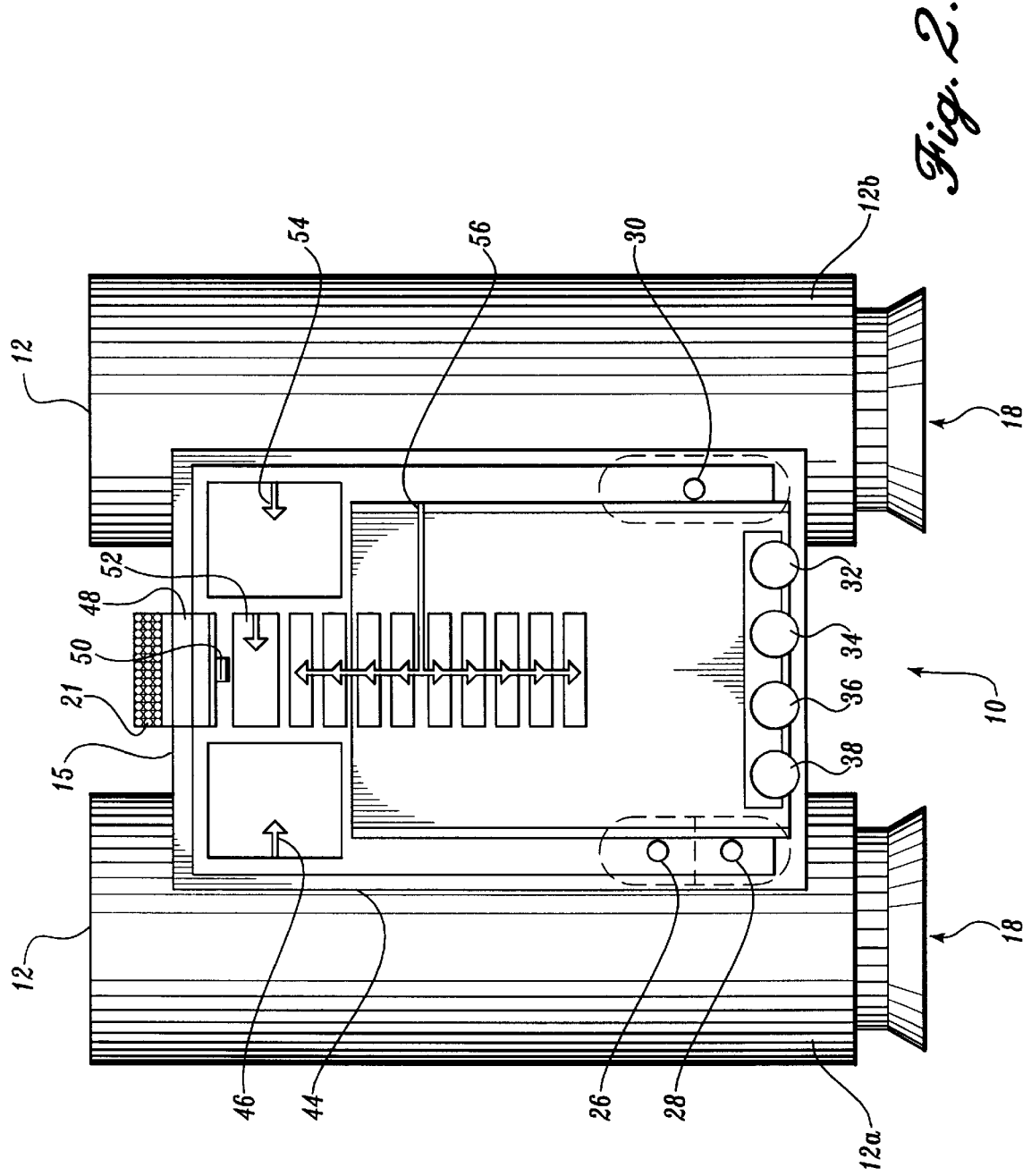
FIG. 2 is a sectional top view of the unit of FIG. 1, with parts removed for detail.

As shown on FIG. 2, the rear vertical edge of the digital video camera 15 includes an on/off control 32, a brightness control 34, a color control 36 and a tint control 38. Each of the controls 32, 34, 36, 38 are used to adjust and set the LCD 16 in a manner known in the art. Located below the controls 32, 34, 36, 38 is an opening to a personal computer (PC) Card receiving port 40, shown in FIG. 3, for receiving a PC Card 42 within the digital video camera 15.

A printed circuit board 44 (FIG. 2) is located internally along the length of the digital video camera 15. The printed circuit board 44 includes a processing system, which has a microprocessor 46, an image processor 48, a signal processor 50, a display driver 52, ROM video logic 54, and video cache RAM 56.

A power unit, such as a rechargeable battery 58 (FIG. 3), is inserted beneath the PC Card receiving port 40. Optional power supplies, such as a car adapter (not shown, but well known in the art), an AC power converter (not shown, but well known in the art), or solar (described below), may also be used.

The operation of the hand-held unit 10 can be understood with reference to the above description. A user may utilize the binoculars 12 in a traditional manner; i.e., the binoculars may be pointed at an object and the eyepieces 18 may be manipulated so as to draw the object into focus. This feature does not require a power supply such as the battery 58.

To record an event targeted by the binoculars 12, the user depresses the record button 30, causing the digital video camera 15 to process and store images. The video camera lens 21 receives images and relays the images to the image processor 48, which in turn processes the images and forwards the images to the signal processor 50. The signal processor 50 digitizes the video images processed by the image processor 40 and stores the digitized video images in the video cache RAM 56. Optionally, the digitized video images may be stored on the PC card 42. The destination for the digitized video images of either the video cache RAM 56 or the PC card 42 is determined according to control programs stored in the microprocessor 46 and associated programs in the ROM Video Logic 54. The digitized video images are preferably stored in the video cache RAM 56 and/or the PC card 42 using high speed image compression algorithms that provide maximum performance and storage capability.

The PC card 42 provides retaining and transferring of recorded images for future review on the digital video camera 15 or other PC card enabled devices such as a computer or a television. In addition, PC cards with PCMCIA standards support networking and telecommunications may be utilized for remote storing and viewing of recorded video images. It can be appreciated to one of skill in the art that the PC card 42 could be replaced by more conventional RAM if desired.

Depression of the forward/play button 26 initiates the viewing of stored images from the video cache RAM 56 or the PC card 42. A decompression algorithm is utilized to restructure the compressed, digitized video images. The retrieved images are viewed on the LCD 16. Alternatively, the reverse button 28 may be depressed for playing stored images in reverse. The forward/play and reverse buttons 26, 28 are preferably tri-state such that each press of the buttons alters the replay flow from normal motion to slow motion to frozen motion. It can be appreciated by one of skill in the art that the buttons 26, 28 can perform multiple functions relating to video viewing, such as high speed scanning. A single play control button could be used in place of the forward/play and reverse buttons 26, 28 for performing similar functions.

Figure 4:
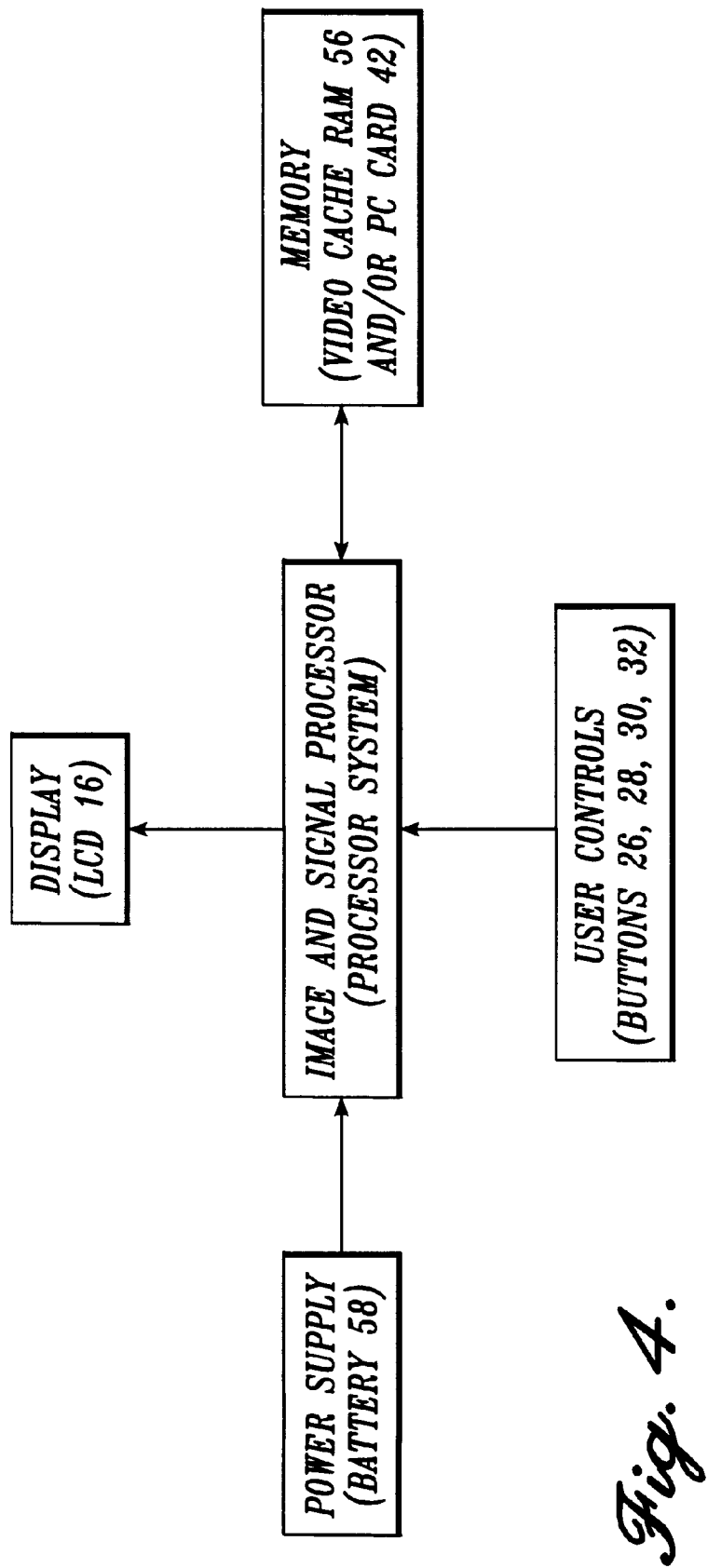
FIG. 4 is a block diagram displaying the processing and control features of the unit of FIG. 1.

FIG. 4 illustrates a block diagram of the process and features control of the present invention. The processing system receives control signals from the buttons 26, 28, 30, 32 and DC power from the battery 58. If the processing system receives a "record" control signal from the record button 30, the processing system delivers recorded images to memory (the video cache RAM 56 or the PC card 42) for storage. If a "playback" control signal is delivered by the forward/play button 26 to the processing system, the processing system retrieves images from the memory (the video cache RAM 56 or the PC card 42) and sends the images to the display (the LCD 16). The controls 32, 34, 36, 38 and control circuitry (not shown, but well known in the art) provide a user control of image processing for the display of the processed images.

Figure 5:
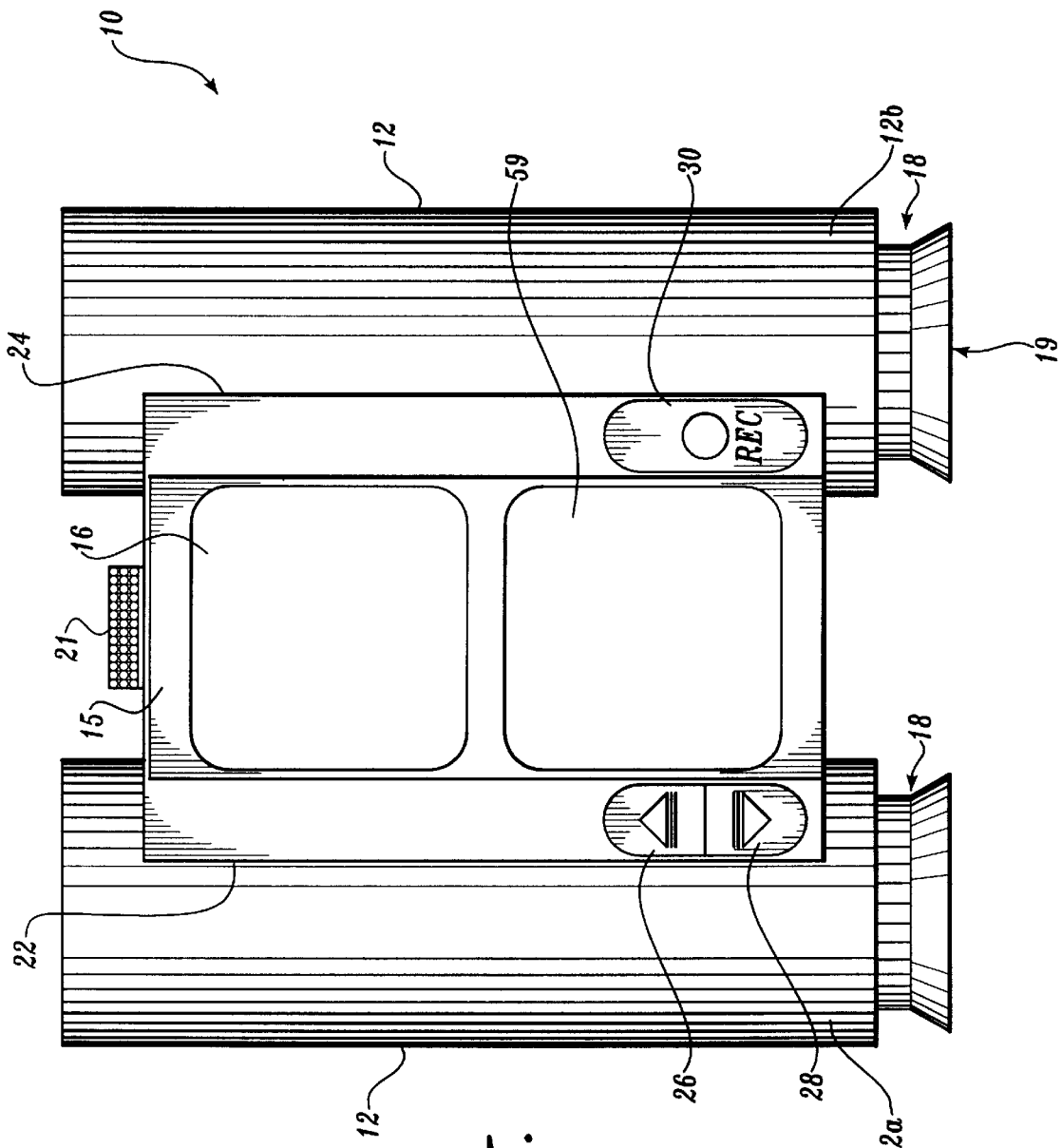
FIG. 5 is a top view of the unit of FIG. 1, with an added solar power converter.
Figure 9:
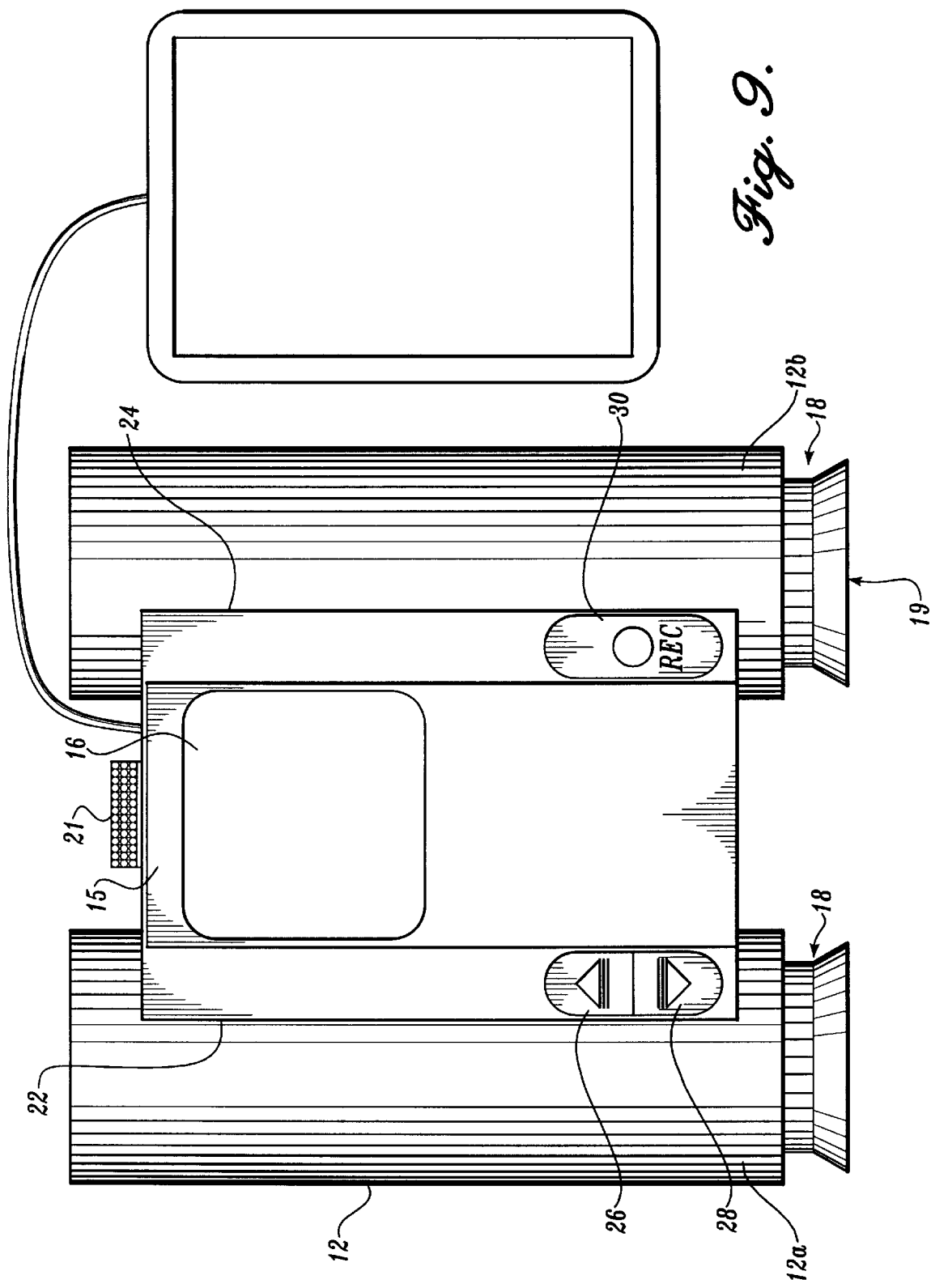
FIG. 9 is a top view of the unit of FIG. 1, with an added, remote solar power converter.

FIG. 5 illustrates an alternate feature for powering the unit 10. Located on the top of the video camera 15, adjacent to the LCD 16, is a solar power converter 59, such as is known in the art. The solar power converter 59 converts solar energy to DC electric current to power the digital video camera 15 and charge the rechargeable battery 58. The solar power converter 59 may be remotely connected, as shown by solar converter 59a in FIG. 9, either stand alone or attachable to an object surface that receives a considerable amount of solar rays, such as a hat worn on a user's head, an umbrella, a backpack, etc.

Figure 6:
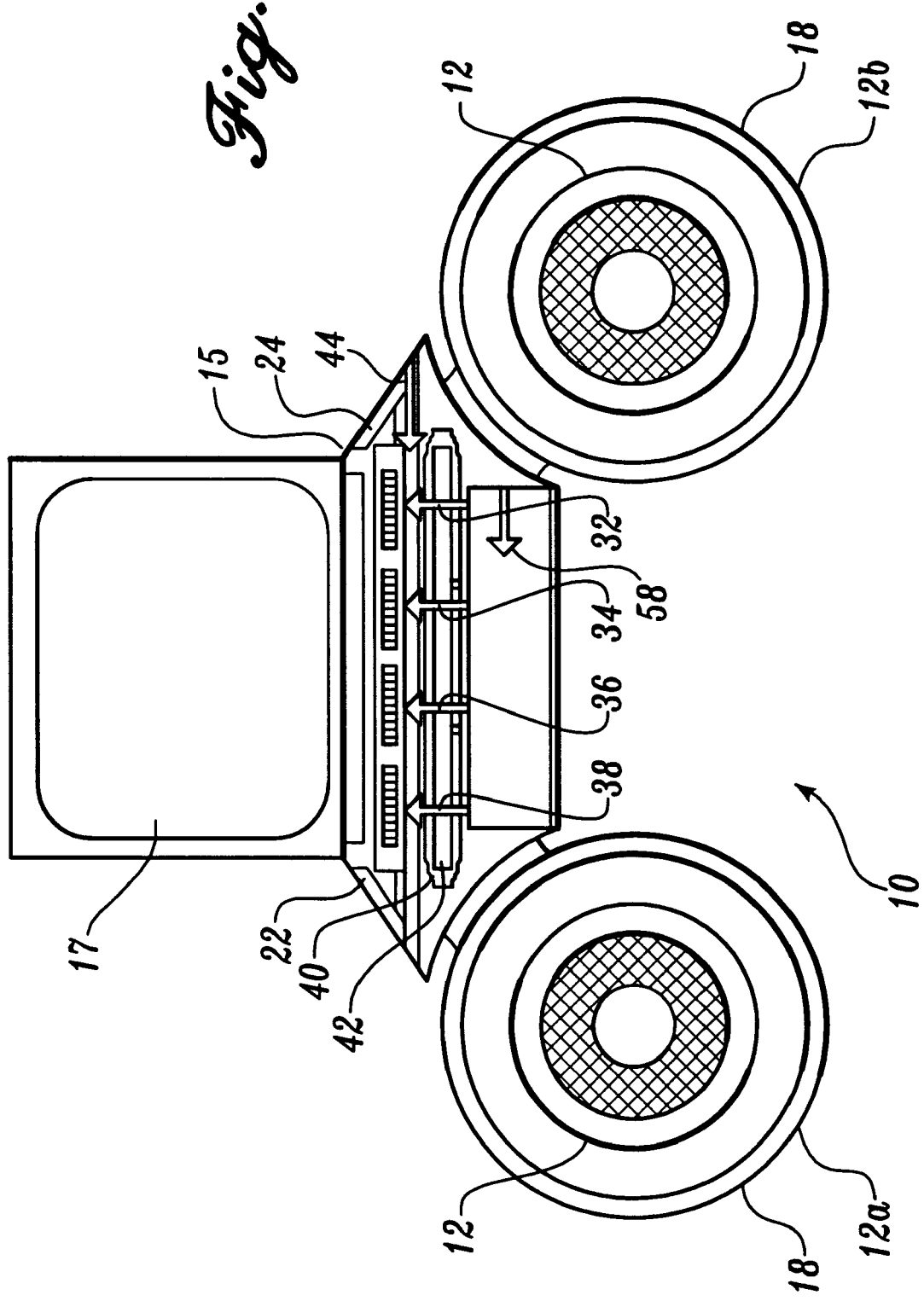
FIG. 6 is a sectional rear view of the unit of FIG. 1 with an optional display positioning feature.

FIG. 6 illustrates a LCD 17 that is rotatable on the top of the digital video camera 15, while still maintaining an electrical connection to the processing system Preferably, the LCD 17 rotates about the rear edge of the LCD 17, the edge closest to the eyepieces 18, to a vertical position for optimal viewing by the user. Rotation of the LCD 17 through any number of angles up to approximately 180° from a flush mounted position allows viewing of images without rotation of the unit 10. This feature is important if moving the unit 10 to view displayed images would cause the loss of an image targeted by the user.

Figure 7:
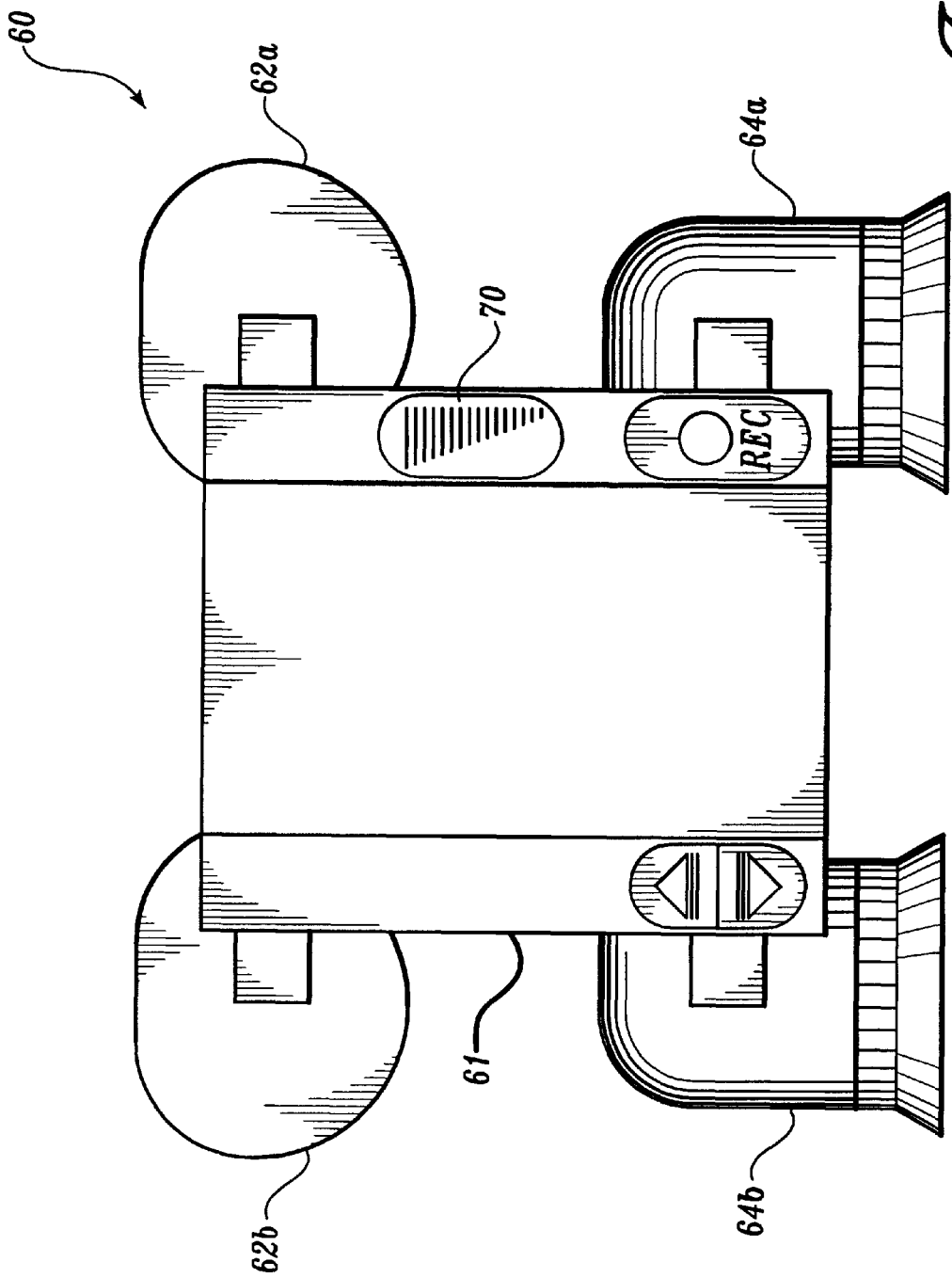
FIG. 7 is a top view of a one piece, hand-held, combined three dimensional video image recording unit.
Figure 8:
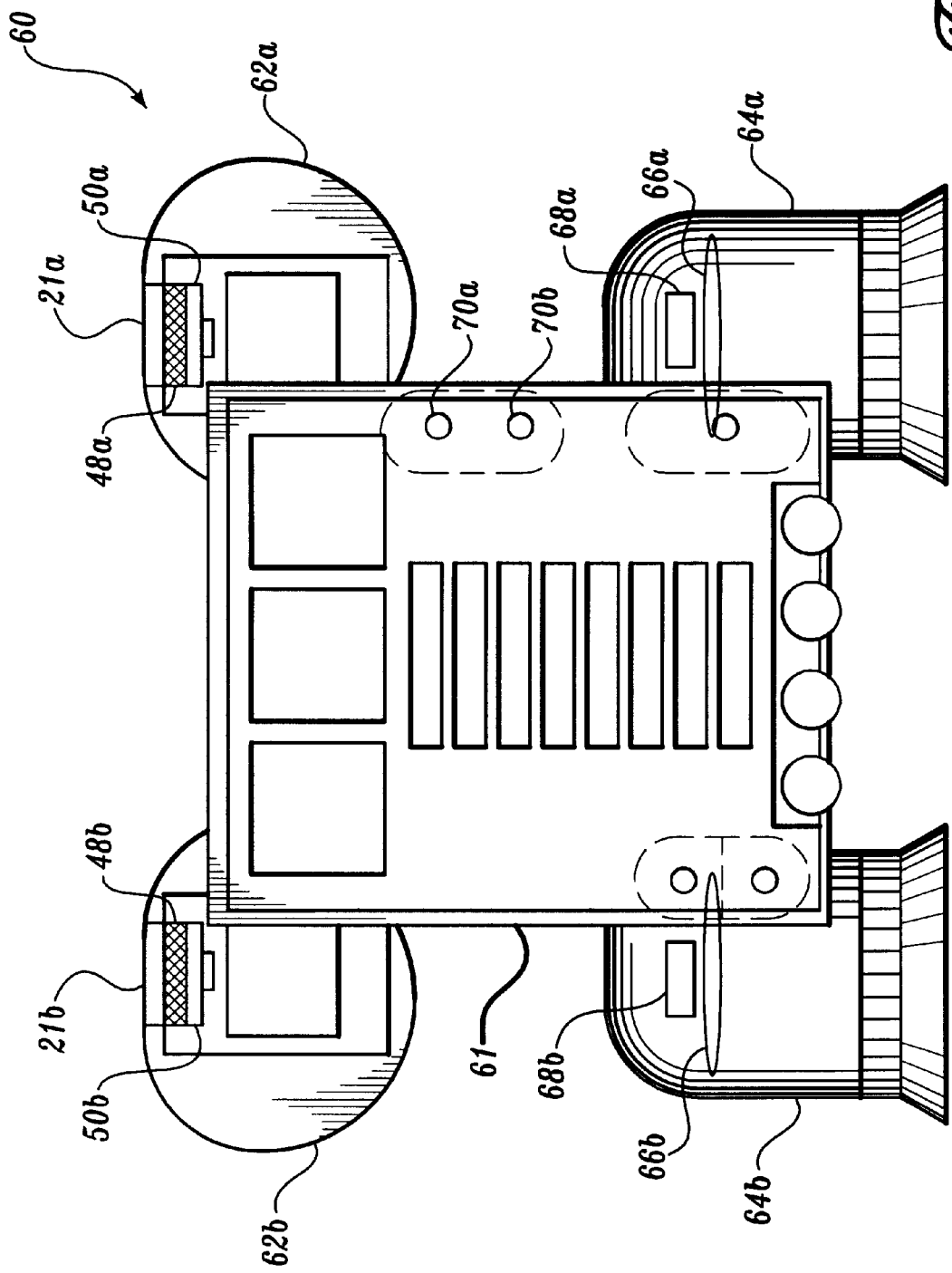
FIG. 8 is a sectional top view of the unit of FIG. 7 with parts removed for detail.
Figure 10:
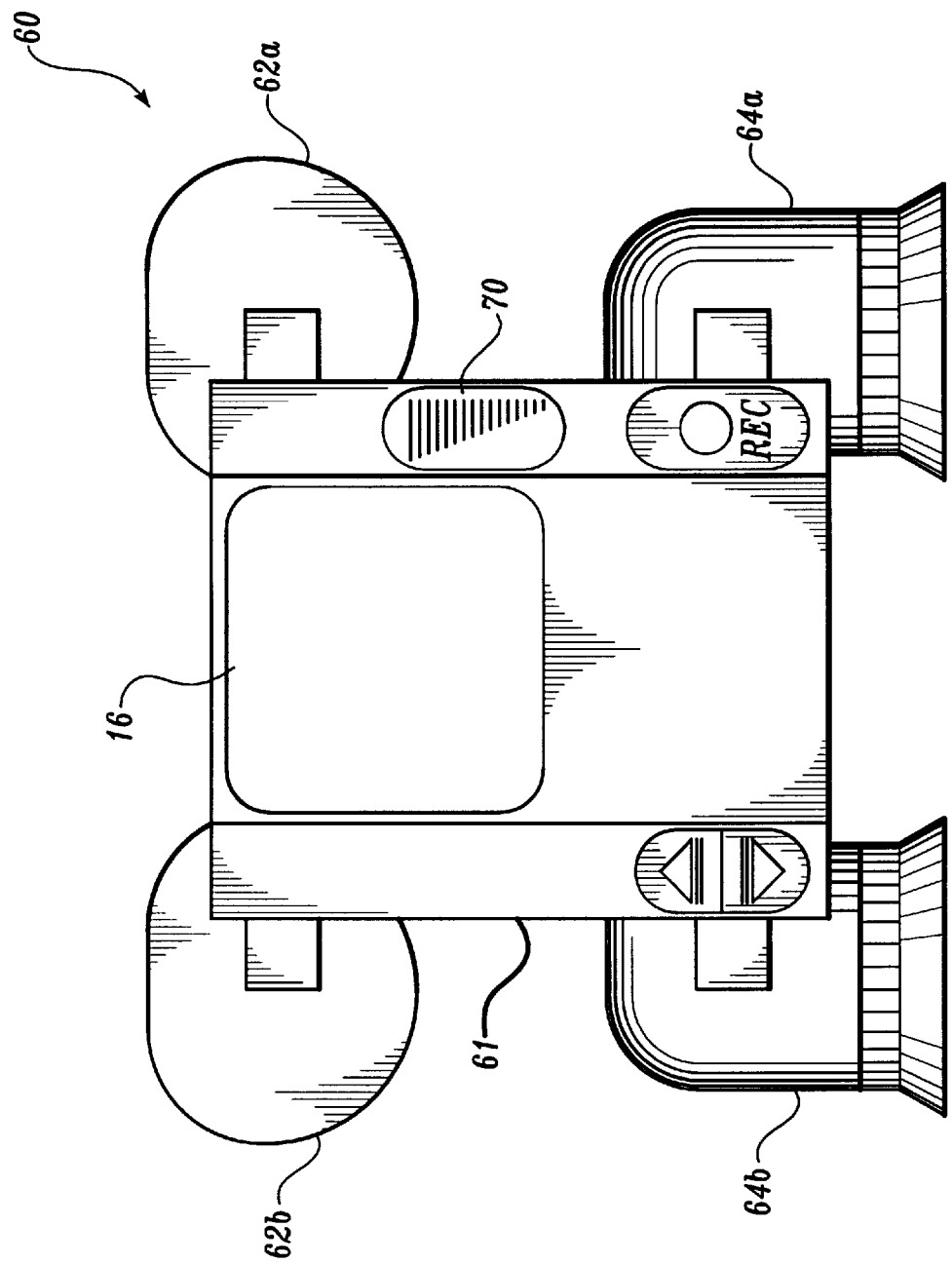
FIG. 10 is a top view of a three-dimensional recording unit as in FIG. 7, with an external display added to the top.

FIGS. 7, 8 and 10 illustrate a three-dimensional image recording and playback unit 60 of the present invention. The unit 60 includes a central housing 61 mounted at its front left bottom corner to the top of a left digital video camera 62a and at its front right bottom corner to the top of a right video camera 62a. The unit 60 also includes eye viewing members 64a, 64b, each mounted under the rear corners of the central housing 61. Each video camera 62a, 62b includes a lens 21a, 21b, an image processor 48a, 48b and a signal processor 50a, 50b. The camera lenses 62a, 62b, the image processors 48a, 48b and the signal processors 50a, 50b generate two sets of digital video images, thus replacing the single lens and corresponding processors of the video camera 15, described above.

The eye viewing members 64a, 64b include display devices 66a, 66b and drivers 68a, 68b. The other processing, controlling and storing components within the housing are similar to those found in the previous embodiment. However, the control logic in unit 60 must be programmed to properly store the two sets of generated digital video images and properly retrieve and process the two sets of stored images or generated two sets of digital images for display on the display devices 66a, 66b. This embodiment can also perform recording from only one camera, thus allowing for storage of a greater number of images. The displaying of the two sets of generated digital video images is done stereoscopically, holographically or by another commonly known two-display three-dimensional viewing technique. When viewed through the eye viewing members 64, a user sees a three-dimensional image, similar to what the user sees through conventional binoculars.

Unit 60 further includes a zoom control button 70. As shown in FIG. 8, the zoom control button 70 includes a zoom portion 70a and an unzoom portion 70b. Depressing the zoom portion 70a of the zoom button 70 causes the camera lenses 62a, 62b to increase focal length, thus zooming in on the scene being viewed. Depressing the unzoom portion 70b of the zoom button 70 causes focal length of the camera lenses 62a, 62b to decrease, thus expanding on the scene being viewed. Focus is maintained by an auto-focus feature.

The processing system may be a general purpose video processing system of a type well known to those skilled in the art. Furthermore, the microprocessor 46 and the processing system may be programmed by a programmer of ordinary skill to accept the inputs, perform the functions, and provide the outputs required for operation of the present invention, given the description contained herein.

The hand-held unit 10 provides a variety of features and advantages not offered in the prior art. The hand-held unit 10 may be used similarly to typical binoculars, without using the digital video camera 15. The digital video camera 15 provides recording and playback of a viewed event. All of the features of the binoculars 12 and the digital video camera 15 are contained within the single, handheld unit 10, thus providing a user with a completely portable system.

Although not shown, it can be contemplated that the camera portion may be remotely located from the other components of the unit with conventional non-wire data transmission techniques performing two-way data communication between the camera and the unit. The camera portion can transmit video images and the unit can transmit controlling signals, such as motion signals directing motorized motion control of the camera. Locating the camera portion in hazardous environments greatly reduces the risks to the user.

Another feature not shown is a coupling feature that allows the hand-held unit to connect to various like devices, such as computers, televisions, etc. The coupling feature provides for the data transmission, such as downloading of stored images, powering the unit, recharging of the unit's battery, etc.

While the embodiments of the invention have been illustrated and described, it will be appreciated that various changes can be made therein without departing from the spirit and scope of the invention, as defined in the appended claims. For example, a central computer can control multiple units to automatically record an event from multiple positions. In another example, image recording can be performed at various resolutions, black and white or color, etc. as determined by manual or automatic control. More images can be stored when recording is performed at lower resolutions.

The embodiments of the invention in which an exclusive property or privilege is claimed are defined as follows:

1. A hand-held unit comprising:
    binoculars having a pair of monocular components, each component having an image viewing end and an image receiving end and defining a line-of-sight, the binoculars providing three-dimensional event viewing from the image viewing end; and
    a digital video camera mounted to the binoculars with the camera lens' line-of-sight approximately parallel to the lines-of-sight of the monocular components, the digital video camera comprising:
        a receiving lens for receiving images;
        a digital memory storage unit integral with the hand-held unit;
        a display device mounted on an exterior surface of the digital video camera;
        a processing system for generating compressed digital motion video images of said received images, storing the compressed digital motion video images in the memory storage unit and displaying the received motion video images on the display device; and means for controlling the generating, storing and displaying of the motion video images, the digital video camera and the display device being arranged relative to the binoculars so that the following modes of operation are possible: mode 1—an event can be recorded contemporaneous with a user viewing in three dimensions the contemporaneous event; and mode 2—a previously-recorded event can be displayed on the display device simultaneous with a user viewing in three dimensions the contemporaneous event.

2. The device of claim 1, wherein the monocular components include a focus mechanism for focusing images viewed through the image viewing end of the monocular components.

3. The device of claim 1, wherein the control means includes forward and reverse video viewing controls.

4. The device of claim 1, wherein the means for controlling includes a zoom control.

5. The device of claim 1, wherein the camera further comprises a removable memory storage unit for storing the compressed video images.

6. The device of claim 1, wherein the camera further comprises means for transmitting data video images off the camera.

7. The device of claim 1, wherein the display is a liquid crystal display.

8. The device of claim 1, wherein the memory storage unit is random access memory (RAM).

9. The device of claim 1, wherein the display is remote of the image viewing end of the binoculars.

10. The device of claim 1, wherein the display is rotatably attached to the digital video camera.

11. The device of claim 1, wherein the digital video camera further comprises a solar power converter for converting solar rays into electrical energy for powering the digital video camera.

12. The device of claim 2, wherein the focusing mechanism is an autofocus mechanism for focusing on targeted images.

13. The device of claim 2, wherein the focusing mechanism is a manual focus mechanism for focusing on targeted images.

14. The device of claim 3, wherein the forward and reverse viewing controls are multi-speed video viewing controls.

15. The device of claim 5, wherein the removable memory storage unit is a PC card.

16. The device of claim 11, wherein the solar power converter is remotely located from the digital video camera and electrically connected to the digital video camera.

17. A hand-held unit comprising:

binoculars having a pair of monocular components, each component having an image viewing end and an image receiving end and defining a line-of-sight, the binoculars providing three-dimensional event viewing from the image viewing end; and a digital video camera mounted to the binoculars with the camera lens' line-of-sight. approximately parallel to the lines-of-sight of the monocular components, the digital video camera; comprising:

a receiving lens for receiving images;
a removable digital memory storage unit;
a display device mounted on an exterior surface of the digital video camera;

a processing system for generating compressed digital motion video images of said received images, storing the compressed digital motion video images in the removable digital memory storage unit and displaying the received motion video images on the display device; and means for controlling the generating, storing and displaying of the motion video images, the digital video camera and the display device being arranged relative to the binoculars so that the following modes of operation are possible: mode 1—an event can be recorded contemporaneous with a user viewing in three dimensions the contemporaneous event; and mode 2—a previously-recorded event can be displayed on the display device simultaneous with a user viewing in three dimensions the contemporaneous event.

18. The device of claim 17, wherein the removable memory storage unit is removable from a location internal to the hand-held unit.

19. The device of claim 18, wherein the removable memory storage unit is a PC card.

20. A hand-held unit comprising:

binoculars having a pair of monocular components, each component having an image viewing end and an image receiving end and defining a line-of-sight, the binoculars providing three-dimensional event viewing from the image viewing end; and a digital video camera mounted to the binoculars with the camera lens' line-of-sight approximately parallel to the lines-of-sight of the monocular components, the digital video camera comprising:

a receiving lens for receiving images;
a digital memory storage unit integral with the hand-held unit;
a display device mounted on an exterior surface of the digital video camera;

a processing system for generating compressed digital motion video images of said received images, storing the compressed digital motion video images in the memory storage unit and displaying the received motion video images on the display device;

means for controlling the generating, storing and displaying of the motion video images, the digital video camera and the display device being arranged relative to the binoculars so that the following modes of operation are possible: mode 1—an event can be recorded contemporaneous with a user viewing in three dimensions the contemporaneous event; and mode 2—a previously-recorded event can be displaced on the display device simultaneous with a user viewing in three dimensions the contemporaneous event; and a solar power converter for converting solar rays into electrical energy for powering the components of the digital video camera.

21. The device of claim 20, wherein the solar power converter is remotely located from the digital video camera and electrically connected to the digital video camera.

22. A hand-held unit comprising:

binoculars having a pair of monocular components, each component having an image viewing end and an image receiving end and defining a line-of-sight, the binoculars providing three-dimensional event viewing from the image viewing end;

a display device remote of the image viewing end of the binoculars; and a digital video camera mounted to the binoculars with the camera lens' line-of-sight approximately parallel to the lines-of-sight of the monocular components, the digital video camera comprising:
  a receiving lens for receiving images;
  a digital memory storage unit integral with the hand-held unit;
  a processing system for generating compressed digital motion video images of said received images, storing the compressed digital motion video images in the memory storage unit and displaying the received motion video images on the display device; and means for controlling the generating, storing and displaying of the motion video images, the digital video camera and the display device being arranged relative to the binoculars so that the following modes of operation are possible: mode 1—an event can be recorded contemporaneous with a user viewing in three dimensions the contemporaneous event: and mode 2—a previously-recorded event can be displayed on the display device simultaneous with a user viewing: in three dimensions the contemporaneous event.

* * * * *

UNITED STATES PATENT AND TRADEMARK OFFICE
CERTIFICATE OF CORRECTION

PATENT NO. : 6,088,053
DATED : July 11, 2000
INVENTOR(S) : J.C. Hammack et al.

It is certified that error appears in the above-identified patent and that said Letters Patent is hereby corrected as shown below:

| COLUMN | LINE | |
|---|---|---|
| [76] Pg. 1, col. 1 | Inventors | "SE." should read --S.E.-- |
| [76] Pg. 1, col. 1 | Inventors | "SW." should read --S.W.-- |
| 7 (Claim 17, | 61 line 8) | after "line-of-sight" delete "." |
| 7 (Claim 17, | 63 line 10) | after "camera" delete ";" |
| 10 (Claim 22, | 7 line 27) | "event:" should read --event;-- |
| 10 (Claim 22, | 10 line 30) | after "viewing" delete ":" |

Signed and Sealed this

Twenty-second Day of May, 2001

Attest:

NICHOLAS P. GODICI

*Attesting Officer*     Acting Director of the United States Patent and Trademark Office